(12) United States Patent
Noda

(10) Patent No.: US 8,804,018 B2
(45) Date of Patent: Aug. 12, 2014

(54) SOLID-STATE IMAGE PICKUP APPARATUS FOR RECEIVING SIGNALS FROM ODD-NUMBERED AND EVEN-NUMBER COLUMNS

(75) Inventor: Tomoyuki Noda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 13/021,468

(22) Filed: Feb. 4, 2011

(65) Prior Publication Data

US 2011/0194006 A1 Aug. 11, 2011

(30) Foreign Application Priority Data

Feb. 8, 2010 (JP) ................................. 2010-025868

(51) Int. Cl.
*H04N 3/14* (2006.01)
*H04N 5/335* (2011.01)

(52) U.S. Cl.
USPC ............................ 348/302; 348/294; 348/297

(58) Field of Classification Search
CPC ..................................................... H04N 5/335
USPC ................................................. 348/297, 302
See application file for complete search history.

(56) References Cited

U.S. PATENT DOCUMENTS

| 2005/0052940 A1* | 3/2005 | Koizumi et al. | ............. | 365/232 |
| 2006/0056221 A1* | 3/2006 | Koizumi et al. | ............. | 365/64 |
| 2007/0052831 A1* | 3/2007 | Ogura et al. | ................ | 348/308 |
| 2009/0147117 A1* | 6/2009 | Suzuki et al. | ................ | 348/294 |

FOREIGN PATENT DOCUMENTS

| JP | 11-164204 A | 6/1999 |
| JP | 2005-086260 A | 3/2005 |
| JP | 2009-141631 A | 6/2009 |
| JP | 2009-290433 A | 12/2009 |

* cited by examiner

*Primary Examiner* — Roberto Velez
*Assistant Examiner* — Cynthia Segura
(74) *Attorney, Agent, or Firm* — Canon U.S.A., Inc., IP Division

(57) ABSTRACT

A solid-state image pickup apparatus includes a storage, first and second common lines, a first block line that is disposed between the storage and the first common line and receives a signal from an odd-numbered column, a second block line that is disposed between the storage and the second common line and receives a signal from an even-numbered column, first switches for controlling connections between the storage and the first block line, second switches for controlling connections between the storage and the second block line, first control lines for the first switches, second control lines for the second switches, a first lead line for transmitting a signal from the first block line to the first common line, a second lead line for transmitting a signal from the second block line to the second common line, and a scanning unit for supplying pulses to the first and second control lines.

20 Claims, 9 Drawing Sheets

FIG. 5 --RELATED ART--

SOLID-STATE IMAGE PICKUP APPARATUS FOR RECEIVING SIGNALS FROM ODD-NUMBERED AND EVEN-NUMBER COLUMNS

BACKGROUND OF THE INVENTION

1. Field of the Invention

The present invention relates to a solid-state image pickup apparatus used in a video camera, a digital still camera, or the like.

2. Description of the Related Art

CMOS sensors expected to achieve high image quality and high resolution are widely used in digital cameras and digital video cameras. With the increase in the number of pixels in solid-state image pickup apparatuses, the miniaturization of each pixel progresses and performance for such a solid-state image pickup apparatus is increased. The increase in a signal reading speed and the increase in a signal-to-noise (S/N) ratio are applied to achieve high definition. Japanese Patent Laid-Open No. 2005-086260 discloses a technique for achieving a high signal reading speed and a high S/N ratio.

When a pixel pitch is reduced, fixed pattern noise may not be sufficiently suppressed with the technique disclosed in Japanese Patent Laid-Open No. 2005-086260.

In a solid-state image pickup apparatus disclosed in Japanese Patent Laid-Open No. 2005-086260, a line memory that is a reading circuit includes blocks. A lead line for connecting a block line and a common signal line is sandwiched between a control line and an inversion control line for a switch used for transferring a signal from the block line to the common line. Since the electric deflection of the lead line caused by a pulse signal passing through the control line can be prevented with an inverted signal passing through the inversion control line, the occurrence of fixed pattern noise can be suppressed.

However, as the reduction in a pixel pitch progresses in solid-state image pickup apparatuses, the arrangement pitch of a reading circuit is reduced. It is therefore difficult to obtain space for the above-described two switch control lines. The technique disclosed in Japanese Patent Laid-Open No. 2005-086260 is not suitable for the reduction in a pixel pitch.

SUMMARY OF THE INVENTION

An apparatus according to an embodiment of the present invention includes a pixel region including a plurality of pixel columns, a line memory including a plurality of storage units each configured to store a signal output from corresponding one of the plurality of pixel columns, a first common signal line to which a first signal is output from the line memory, a second common signal line to which a second signal is output from the line memory, a first block line that is disposed on a first signal path between the line memory and the first common signal line and is configured to receive a signal that has been output from one of an odd-numbered pixel column and an even-numbered pixel column and has been stored in one of the plurality of storage units, a second block line that is disposed on a second signal path between the line memory and the second common signal line and is configured to receive a signal that has been output from the other one of the odd-numbered pixel column and the even-numbered pixel column and has been stored in one of the plurality of storage units, a plurality of first switches that are disposed on a third signal path between the line memory and the first block line and are each configured to control an electric connection between one of the plurality of storage units and the first block line, a plurality of second switches that are disposed on a fourth signal path between the line memory and the second block line and are each configured to control an electric connection between one of the plurality of storage units and the second block line, a plurality of first control lines each configured to supply a first driving pulse for controlling a conductive state of one of the plurality of first switches, a plurality of second control lines each configured to supply a second driving pulse for controlling a conductive state of one of the plurality of second switches, at least one first lead line configured to transmit a third signal output from the first block line to the first common signal line, and at least one second lead line configured to transmit a fourth signal output from the second block line to the second common signal line.

Further features of the present invention will become apparent from the following description of exemplary embodiments with reference to the attached drawings.

DESCRIPTION OF THE EMBODIMENTS

Figure 1:
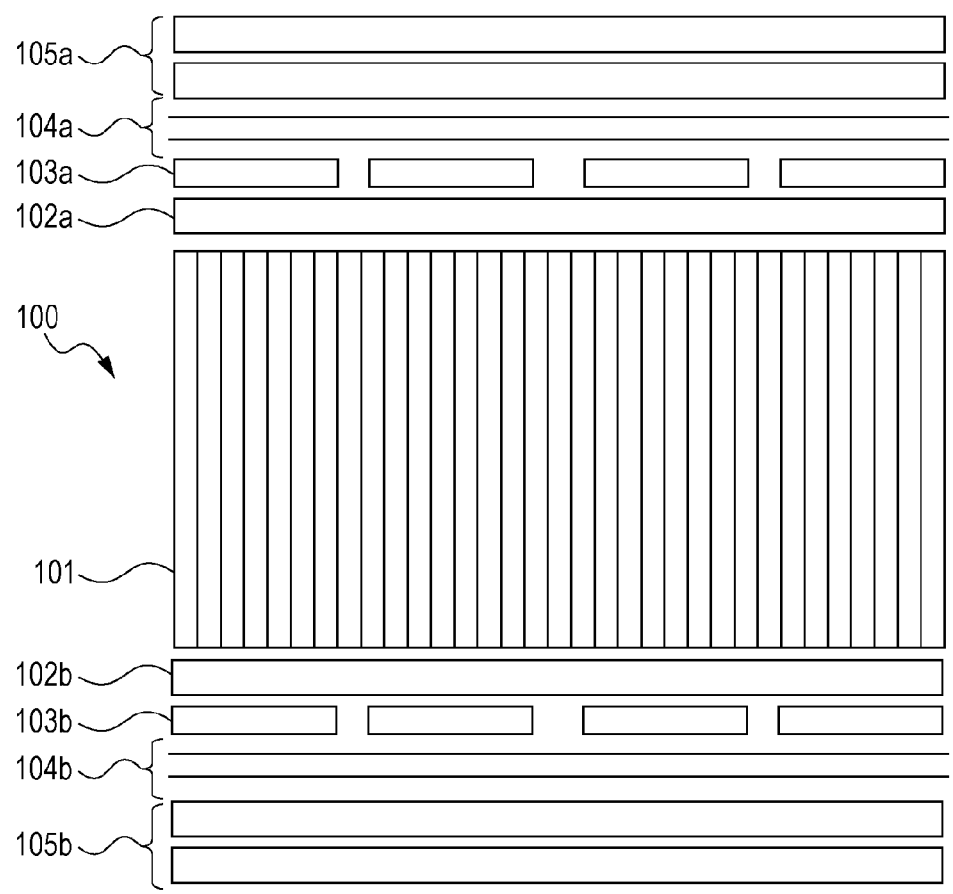
FIG. 1 is a diagram illustrating the entire configuration of a solid-state image pickup apparatus according to an embodiment of the present invention.

First, a solid-state image pickup apparatus according to an embodiment of the present invention will be described. FIG. 1 is a block diagram illustrating the entire configuration of a solid-state image pickup apparatus according to an embodiment of the present invention.

In a pixel region 100, an array of a plurality of pixels is formed. These pixels are two-dimensionally arranged, but may be one-dimensionally arranged. Each of the pixels includes a photoelectric conversion unit, and may further include a switch for transferring a signal generated by the photoelectric conversion unit, an amplification element for amplifying the signal, and a reset element for resetting the signal.

A pixel column 101 includes at least one pixel, and also includes a plurality of pixels arranged in a single direction. A plurality of pixels may be arranged in a line, in a staggered pattern, or in a zigzag pattern. The pixel region 100 includes a plurality of pixel columns.

Line memories 102a and 102b have a function of storing signals that have been read out from a plurality of pixel columns in parallel. More specifically, each of the line memories 102a and 102b includes a plurality of storage units that are capacitors.

Between a line memory unit 102 and the pixel region 100, a column amplification unit, a CDS circuit, and AD converter may be disposed as appropriate.

Each of block line units 103a and 103b reads out a signal from a group of output nodes of a predetermined number of storage units included in the line memory, and includes a block line, a switch for controlling an electric connection between the block line and the line memory, and a switch for controlling an electric connection between the block line and a common signal line to be described later.

Each of common signal lines 104a and 104b reads out a signal from the block line and externally outputs the signal from a chip. Each of the common signal lines 104a and 104b includes at least two common signal lines. That is, in FIG. 1, four common signal lines are included.

A scanning unit 105a supplies to the switch included in the block line unit 103a a driving pulse for causing the switch to sequentially output signals to the common signal line 104a. A scanning unit 105b supplies to the switch included in the block line unit 103b a driving pulse for causing the switch to sequentially output signals to the common signal line 104b. Each of the scanning units 105a and 105b includes two types of scanning circuits so as to separately read out signals from an odd-numbered pixel column and an even-numbered pixel column. This contributes to the increase in a signal reading speed.

In FIG. 1, the line memory unit 102, the block line unit 103, and the common signal line 104 are disposed on the upper side and the lower side of the pixel region 100. There are a plurality of methods of routing signals from pixel columns to an upper reading circuit and a lower reading circuit. For example, a method of routing signals from even-numbered pixel columns to one of the upper reading circuit and the lower reading circuit and routing signals from odd-numbered pixel columns to the other one of the upper reading circuit and the lower reading circuit can be considered. Such a method of upwardly and downwardly routing signals can increase a signal reading speed. The line memory unit 102, the block line unit 103, and the common signal line 104 may be disposed on only one side of the pixel region 100 on the basis of the number of pixels and a reading speed, and are correctively called a reading circuit.

Embodiments of the present invention will be described in detail below. In embodiments, the configuration of a portion between the line memory and the common signal line, which are illustrated in FIG. 1, will be described. When signals are routed from a plurality of pixel columns to an upper reading circuit and a lower reading circuit, the assignment of an odd number or an even number to these pixel columns is performed in accordance with the arrangement order of the pixel columns.

First Embodiment

Figure 2:
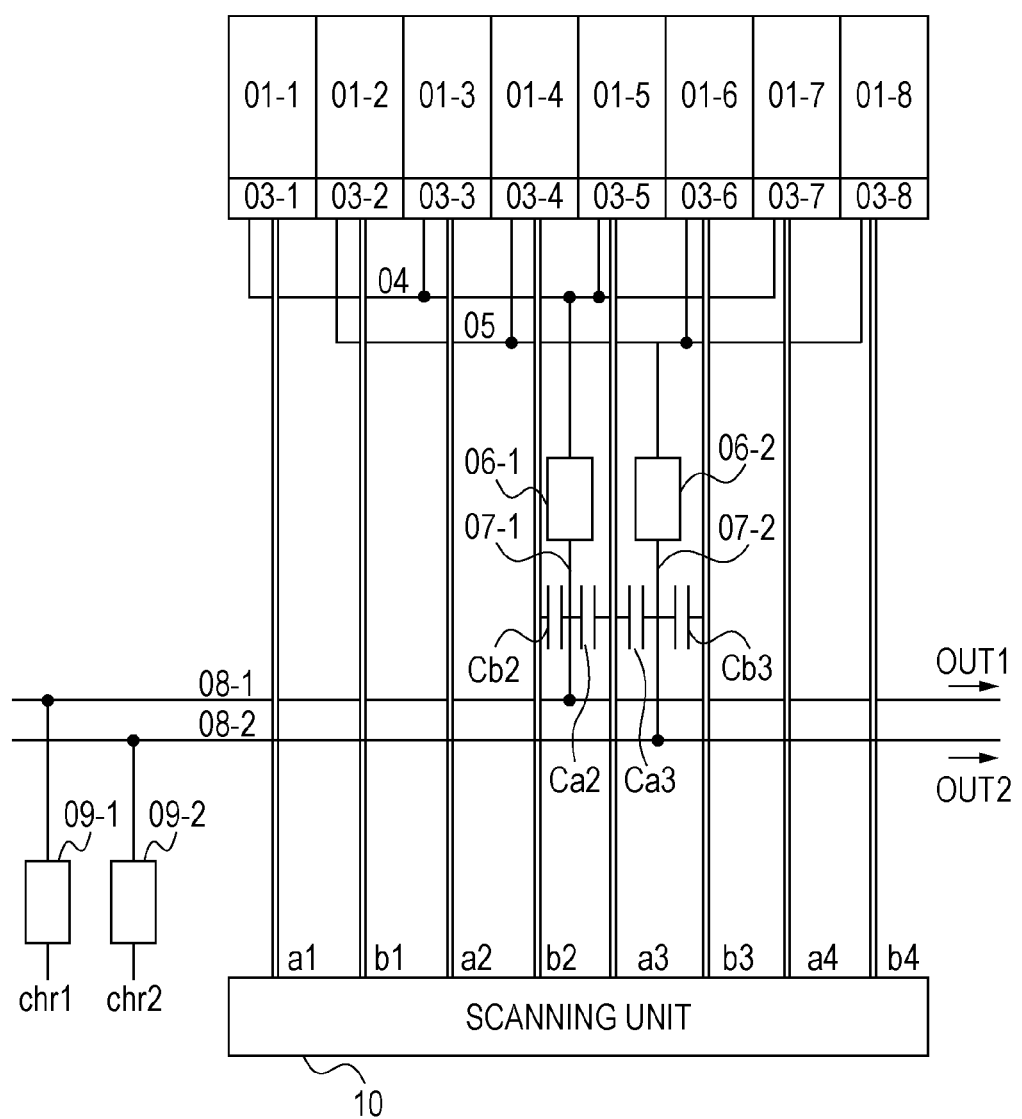
FIG. 2 is a diagram illustrating the layout of elements in a solid-state image pickup apparatus according to a first embodiment of the present invention.

FIG. 2 is a diagram illustrating the layout of elements in a reading circuit in a solid-state image pickup apparatus according to the first embodiment. Here, reading circuits for two blocks are illustrated.

Referring to FIG. 2, a line memory for storing signals output from pixel columns includes storage units 01-1 to 01-8. The storage units 01-1 to 01-8 are classified into two types of storage units, a storage unit for storing a signal output from an odd-numbered pixel column and a storage unit for storing a signal output from an even-numbered pixel column. For the increase in a signal reading speed, a signal stored in a storage unit of one of two types and a signal stored in a storage unit of the other one of two types are read out to different block lines.

Signals output from odd-numbered pixel columns are individually stored in storage units and are then read out to a first block line 04. Signals output from even-numbered pixel columns are individually stored in storage units and are then read out to a second block line 05. The first block line 04 and the second block line 05 are disposed on a signal path between the line memory and common signal lines 08-1 and 08-2.

Each of transfer switches 03-1 to 03-8 is used to transfer a signal output from a pixel column from the line memory to the first block line 04 or the second block line 05, and controls an electric connection between the line memory and the first block line 04 or the second block line 05. The transfer switches 03-1 to 03-8 are disposed on a signal path between the line memory and the block lines 04 and 05. Transfer switches for transferring a signal output from an odd-numbered pixel column are referred to as first switches, and transfer switches for transferring a signal output from an even-numbered pixel column are referred to as second switches.

Each of block selection switches 06-1 and 06-2 selects a predetermined one of a plurality of blocks and electrically connects the selected block to the common signal line 08-1 or 08-2.

A first lead line 07-1 transmits a signal from the first block line 04 to the first common signal line 08-1 to be described later. A second lead line 07-2 transmits a signal from the second block line 05 to the second common signal line 08-2 to be described later.

Each of the first common signal line 08-1 and the second common signal line 08-2 receives a signal from the line memory and then externally outputs the signal via a buffer circuit (not illustrated), a multiplexer (not illustrated), or the like disposed as appropriate.

First control lines a1 to a4 control the conductive states of the first switches 03-1, 03-3, 03-5, and 03-7, respectively. Second control lines b1 to b4 control the conductive states of the second switches 03-2, 03-4, 03-6, and 03-8, respectively.

A reset unit 09-1 resets the potential of the first common signal line 08-1. A reset unit 09-2 resets the potential of the second common signal line 08-2. Reset control lines chr1 and chr2 supply reset control pulses to the reset units 09-1 and 09-2, respectively.

A scanning unit 10 supplies driving pulses for the transfer switches 03-1 to 03-8, and includes a shift register and a decoder. The scanning unit 10 can sequentially bring the transfer switches 03-1 to 03-8 into conduction in one direction. For example, the scanning unit 10 sequentially brings the transfer switches 03-1 to 03-8 into conduction from left to right in the drawing. The scanning unit 10 has a configuration capable of sequentially or randomly scanning the transfer switches 03-1 to 03-8. The scanning unit 10 may include two types of scanning circuits as illustrated in FIG. 1 so as to separately control reading of a signal from an odd-numbered pixel column and reading of a signal from an even-numbered pixel column.

A parasitic capacitance Ca2 generated between the first control line a3 and the first lead line 07-1, a parasitic capacitance Ca3 generated between the first control line a3 and the second lead line 07-2, a parasitic capacitance Cb2 generated between the second control line b2 and the first lead line 07-1, and a parasitic capacitance Cb3 generated between the second control line b3 and the second lead line 07-2 are schematically illustrated.

The positional relationship among the first control lines a1 to a4, the second control lines b1 to b4, the first lead line 07-1, and the second lead line 07-2 will be described in detail below. It is possible to suppress fixed pattern noise by disposing the first lead line 07-1 and the second lead line 07-2 in accordance with the following rules.

The first rule is to dispose each of the first lead line 07-1 and the second lead line 07-2 in a region between a control line for a block and a control line for another block. That is, each of the first lead line 07-1 and the second lead line 07-2 is disposed between one of the first control lines a1 to a4 and one of the second control lines b1 to b4 so that the lead line is adjacent to the first control line and the second control line. More specifically, the second control line b2 for reading out a signal from an even-numbered pixel column is disposed on the left side of the first lead line 07-1, and the first control line a3 for reading out a signal from an odd-numbered pixel column is disposed on the right side of the first lead line 07-1. The first control line a3 for reading out a signal from an odd-numbered pixel column is disposed on the left side of the second lead line 07-2, and the second control line b3 for reading out a signal from an even-numbered pixel column is disposed on the right side of the second lead line 07-2.

The second rule is to alternately dispose a control line and a lead line along a direction parallel to the scanning direction of the scanning unit 10. More specifically, the second control line b2, the first lead line 07-1, the first control line a3, the second lead line 07-2, and the second control line b3 are disposed in this order along a direction parallel to the scanning direction of the scanning unit 10. On the upstream side of the scanning direction as viewed from each lead line, a control line for controlling the reading of a signal from a block different from a block controlled by the lead line is disposed. On the upstream side (left side in the drawing) of the scanning direction as viewed from the first lead line 07-1, the second control line b2 is disposed. On the upstream side (left side in the drawing) of the scanning direction as viewed from the second lead line 07-2, the first control line a3 is disposed.

When the first lead line 07-1 is disposed in accordance with the above-described rules, the first lead line 07-1 is between the second control line b1 and the first control line a2, between the second control line b2 and the first control line a3, or between the second control line b3 and the first control line a4. In this embodiment, the first lead line 07-1 is disposed between the second control line b2 and the first control line a3.

When the second lead line 07-2 is disposed in accordance with the above-described rules, the second lead line 07-2 is between the first control line a1 and the second control line b1, between the first control line a2 and the second control line b2, between the first control line a3 and the second control line b3, or between the first control line a4 and the second control line b4. In this embodiment, the second lead line 07-2 is disposed between the first control line a3 and the second control line b3.

By achieving the above-described positional relationship, in a sampling period of a single signal, the directions of changes in potentials of the first lead line 07-1 and the second lead line 07-2 caused by the change in the level of a driving pulse for at least one of the first control lines a1 to a4 and the second control lines b1 to b4 can be opposite. As a result, an offset in the signal can be suppressed.

Figure 3:
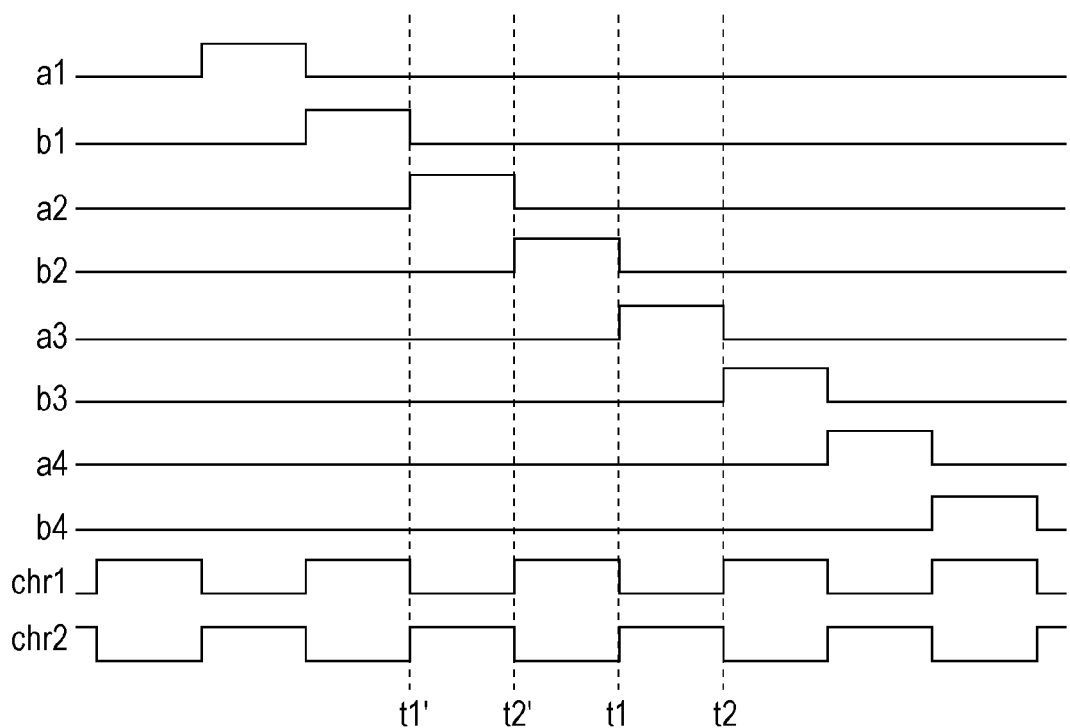
FIG. 3 is a timing chart describing the driving of a solid-state image pickup apparatus according to the first embodiment.

The suppression of an offset in a signal will be described with reference to a diagram illustrating driving pulses. FIG. 3 is a timing chart describing reading of signals from the storage units 01-1 to 01-8 to the common signal lines 08-1 and 08-2. In this embodiment, when the reset period and the signal reading period (non-reset period) of one of the first common signal line 08-1 and the second common signal line 08-2 is one period, the reset period of one of these common signal lines and the reading period of the other one of these common signal lines correspond to each other. That is, the reading of a signal from the second block is performed one-half period after the reading of a signal from the first block has been performed. This leads to the increase in a signal reading speed.

The operation of a solid-state image pickup apparatus driven as illustrated in FIG. 3 will be described in detail. The scanning unit 10 sequentially supplies high-level driving pulses to the first control lines and the second control lines from left to right in the drawing, so that signals are sequentially read out from the first control lines and the second control lines. A period in which a high-level driving pulse is supplied to the reset control line chr1 or chr2 is the reset period of a corresponding common signal line, and a period in which a low-level driving pulse is supplied to the reset control line chr1 or chr2 is the signal reading period of a corresponding common signal line.

Immediately before a time t1, the reset unit 09-1 receives a reset control signal from the reset control line chr1 and resets the potential of the first common signal line 08-1.

At the time t1, a low-level pulse is supplied to the second control line b2 and a period in which a signal stored in the storage unit 01-4 is read out ends. The low-level pulse and the parasitic capacitance Cb2 occurring at the first common signal line 08-1 cause a negative voltage change (deflection) represented by the following equation at the first common signal line 08-1.

$$\Delta V08\text{-}1 \cong -VDD \times Cb2/CH1 \qquad \text{Equation (1)}$$

Here, VDD represents a reset voltage, and CH1 represents a parasitic capacitance of the first common signal line 08-1.

At the time t1, a high-level pulse is supplied to the first control line a3, and a signal stored in the storage unit 01-5 is output via the first switch 03-5, the first block line 04, and the first lead line 07-1. At a time in a period in which the first control line a3 is at the high level, a circuit (not illustrated) disposed at a stage subsequent to the first common signal line 08-1 samples the signal. The parasitic capacitance Ca3 and the high-level driving pulse supplied to the first control line a3 cause a positive voltage change (deflection) represented by the following equation.

$$\Delta V08\text{-}1 \cong VDD \times Ca3/CH2 \qquad \text{Equation (2)}$$

Here, CH2 represents a parasitic capacitance of the second common signal line 08-2.

$$\Delta V08\text{-}1 \cong VDD \times Ca3/CH2 - VDD \times Cb2/CH1 = VDD \times (Ca3-Cb2)/CH \qquad \text{Equation (3)}$$

It is assumed that CH1≅CH2≅CH is set. In general, since it is possible to dispose a plurality of common signal lines so that the same positional relationship among a common signal line and surrounding elements is obtained, it can be determined that parasitic capacitances of these common signal lines are substantially equal.

That is, the positive voltage change caused by the first control line a3 and the negative voltage change caused by the second control line b2 occur in a period in which a single signal is sampled and cancel each other. In one embodiment, the second control line b2, the first control line a3, and the first lead line 07-1 are disposed at regular intervals and Cb2≅Ca3 is set. In this case, the total voltage change (deflection) is represented by the following equation.

$$\Delta V08\text{-}1 \cong VDD \times Ca3/CH2 - VDD \times Cb2/CH1 = VDD \times (Ca3-Cb2)/CH \cong 0 \quad \text{Equation (3')}$$

Accordingly, the amount of offset can be substantially zero.

A voltage change (deflection) at the second common signal line 08-2 at a time t2 is similarly represented by the following equation.

$$\Delta V08\text{-}2 \cong VDD \times Cb3/CH - VDD \times Ca3/CH = VDD \times (Cb3-Ca3)/CH \quad \text{Equation (4)}$$

The same assumption that parasitic capacitances are equal which has been used to obtain Equation (3') is used, the following equation is obtained.

$$\Delta V08\text{-}2 \cong VDD \times Cb3/CH - VDD \times Ca3/CH = VDD \times (Cb3-Ca3)/CH \cong 0 \quad \text{Equation (4')}$$

At that time, the total voltage change (deflection) is substantially zero, and fixed pattern noise can be therefore reduced to substantially zero.

On the other hand, a case in which, on the upstream side (left side in the drawing) of the scanning direction of the scanning unit 10 as viewed from each lead line, a control line for controlling the output of a signal from a block controlled by the lead line is disposed will be considered. For example, a case in which the first control line a2 is disposed on the upstream side of the scanning direction as viewed from the first lead line 07-1 will be considered.

In this case, at a time t1' illustrated in FIG. 3, a high-level pulse is supplied to the first control line a2, and a signal stored in the storage unit 01-3 is read out to the first common signal line 08-1 via the first switch 03-3, the first block line 04, and first lead line 07-1. At a time in a period in which the high-level pulse is supplied to the first control line a2, a circuit (not illustrated) at the subsequent stage samples the signal read out to the first common signal line 08-1. Here, it is assumed that the parasitic capacitance Ca2 is generated between the first lead line 07-1 and the first control line a2. A potential change represented by the following equation occurs at the first common signal line 08-1.

$$\Delta V08\text{-}1 \cong VDD \times Ca2/CH1 \quad \text{Equation (5)}$$

Since a driving pulse for causing a potential change for canceling the above-described potential change is not supplied in a period in which the reading of a signal from the storage unit 01-5 is performed, an offset represented by Equation (5) is superimposed on the signal.

In contrast, according to an embodiment of the present invention, it is possible to cause a potential change at the first control line and a potential change at the second control line which cancel each other in a single signal reading period.

In this embodiment, the number of pixel columns from which signals are individually read out to each block line is four. However, the number of pixel columns may be increased. In this case, in order to suppress a delay difference between signals in each block, a lead line is to be disposed at the midpoint in a direction in which a block line extends and be connected to the block line.

In this embodiment, the fall of a pulse supplied to a control line for a block to a low level and the rise of a pulse supplied to a control line for another block to a high level occur at substantially the same time. This may be preferable from the view point of the increase in a signal reading speed since a time used to suppress an offset after potential changes have canceled each other can be reduced. In general, a pulse transitionally falls or rises to a desired level. Accordingly, the period of transition from an ON state to an OFF state and the period of transition from the OFF state to the ON state may at least partly overlap.

As described previously, according to this embodiment, potential changes at common signal lines generated by control lines cancel each other. It is therefore possible to suppress an offset component superimposed on a signal.

Second Embodiment

The second embodiment will be described with reference to FIGS. 2 and 4. The layout of elements similar to that described in the first embodiment can be used. Driving timing according to the second embodiment differs from that according to the first embodiment. The same reference numerals are used to identify parts already described in the first embodiment, and the description thereof will be therefore omitted. The difference between the second embodiment and the first embodiment will be described.

Figure 4:
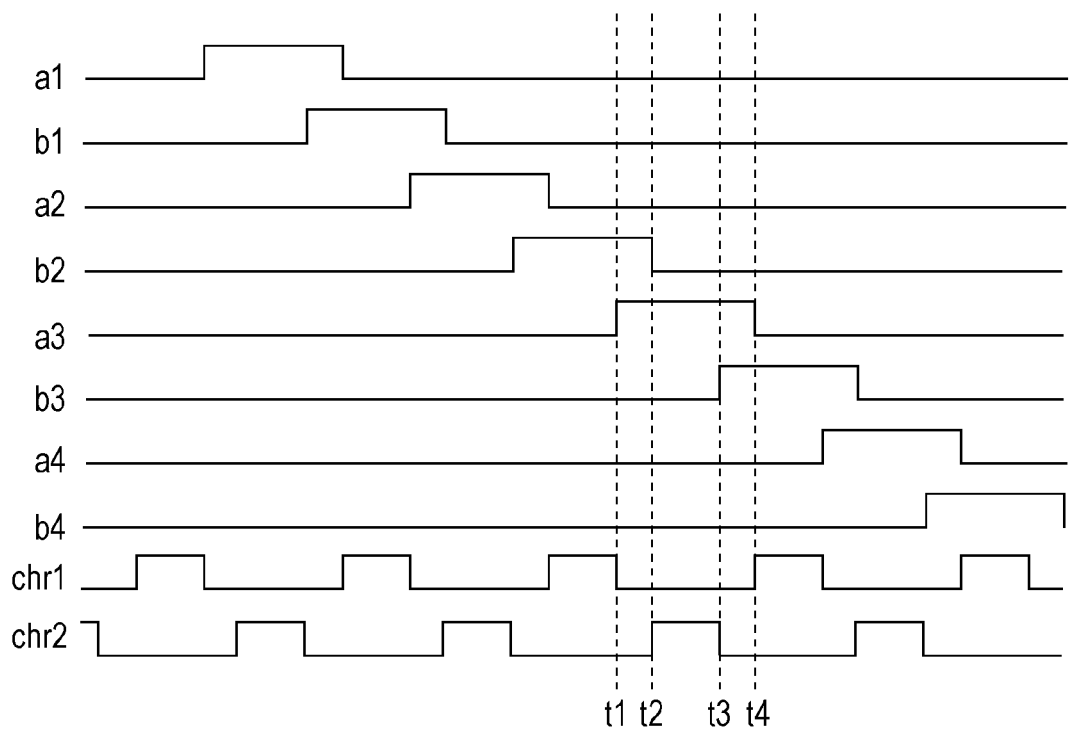
FIG. 4 is a timing chart describing the driving of a solid-state image pickup apparatus according to a second embodiment of the present invention.

FIG. 4 is a timing chart describing the driving of a solid-state image pickup apparatus according to the second embodiment. Dislike in the first embodiment, in the second embodiment, a period in which a signal is read out from an odd-numbered pixel column to the first common signal line 08-1 and a period in which a signal is read out from an even-numbered pixel column to the second common signal line 08-2 partly overlap. Furthermore, the ratio between a high level and a low level of a pulse supplied to the reset control lines chr1 and chr2 differs from that described in the first embodiment. More specifically, a period in which a pulse is at a high level is shorter than that in which the pulse is at a low level. As a result, a period in which a signal is read out to one of common signal lines and a period in which a signal is read out to the other one of the common signal lines overlap, and a period in which a signal is read out to the same common signal line appears at shorter time intervals. Like in the first embodiment, in the second embodiment, a signal reading period of one of the common signal lines and a reset period of the other one of the common signal lines overlap.

By driving a solid-state image pickup apparatus as described previously, an effect that can be obtained according to the first embodiment can be obtained and signal reading can be more rapidly performed as compared with the first embodiment. In this embodiment, a multiplexer for switching between signals to be externally read out from the first common signal line and the second common signal line is disposed at a stage subsequent to the first common signal line and the second common signal line.

Voltage changes at the first common signal line 08-1 and the second common signal line 08-2 when signal reading is performed as illustrated in FIG. 4 will be described.

First, the voltage change (deflection) at the first common signal line 08-1 will be described.

Immediately before a time t1, the reset unit 09-1 receives a reset control signal from the reset control line chr1 and resets the potential of the first common signal line 08-1.

At the time t1, a high-level pulse is supplied to the first control line a3 and a signal stored in the storage unit 01-5 is read out to the first common signal line 08-1. At that time, the parasitic capacitance Ca3 and the high-level pulse supplied to the first control line a3 cause a positive voltage change (deflection) represented by the following equation at the first common signal line 08-1.

$$\Delta V08\text{-}1 \cong VDD \times Ca3/CH \quad \text{Equation (6)}$$

At a time t2, a low-level pulse is supplied to the second control line b2. A period in which a signal stored in the storage unit 01-4 is read out to the second common signal line 08-2 ends. At that time, the parasitic capacitance Cb2 and the second control line b2 cause a negative voltage change (deflection) represented by the following equation.

$$\Delta V08\text{-}1 \cong -VDD \times Cb2/CH \qquad \text{Equation (7)}$$

In this case, the total voltage change (deflection) is represented by the following equation.

$$\Delta V08\text{-}1 \cong VDD \times Ca3/CH - VDD \times Cb2/CH = VDD \times (Ca3-Cb2)/CH \qquad \text{Equation (8)}$$

Thus, potential changes in opposite directions can be caused and an offset can be suppressed.

Like in the first embodiment, by making parasitic capacitances equal to each other, the following equation can be obtained.

$$\Delta V08\text{-}1 \cong VDD \times Ca3/CH - VDD \times Cb2/CH = VDD \times (Ca3-Cb2)/CH \cong 0 \qquad \text{Equation (8')}$$

At times t3 and t4, voltage changes (deflections) similar to those occurred at the first common signal line 08-1 occur at the second common signal line 08-2. The total voltage change is represented by the following equation.

$$\Delta V08\text{-}2 \cong VDD \times Cb3/CH - VDD \times Ca3/CH = VDD \times (Cb3-Ca3)/CH \qquad \text{Equation (9)}$$

Thus, potential changes in opposite directions can be caused and an offset can be suppressed. In addition, by making the parasitic capacitances equal to each other, the following equation can be obtained.

$$\Delta V08\text{-}2 \cong VDD \times Cb3/CH - VDD \times Ca3/CH = VDD \times (Cb3-Ca3)/CH \cong 0 \qquad \text{Equation (9')}$$

That is, a voltage change (deflection) becomes substantially zero, and fixed pattern noise is therefore further suppressed.

According to this embodiment, an effect that can be obtained according to the first embodiment can be obtained, and a signal reading speed can be further increased.

Third Embodiment

Figure 7:
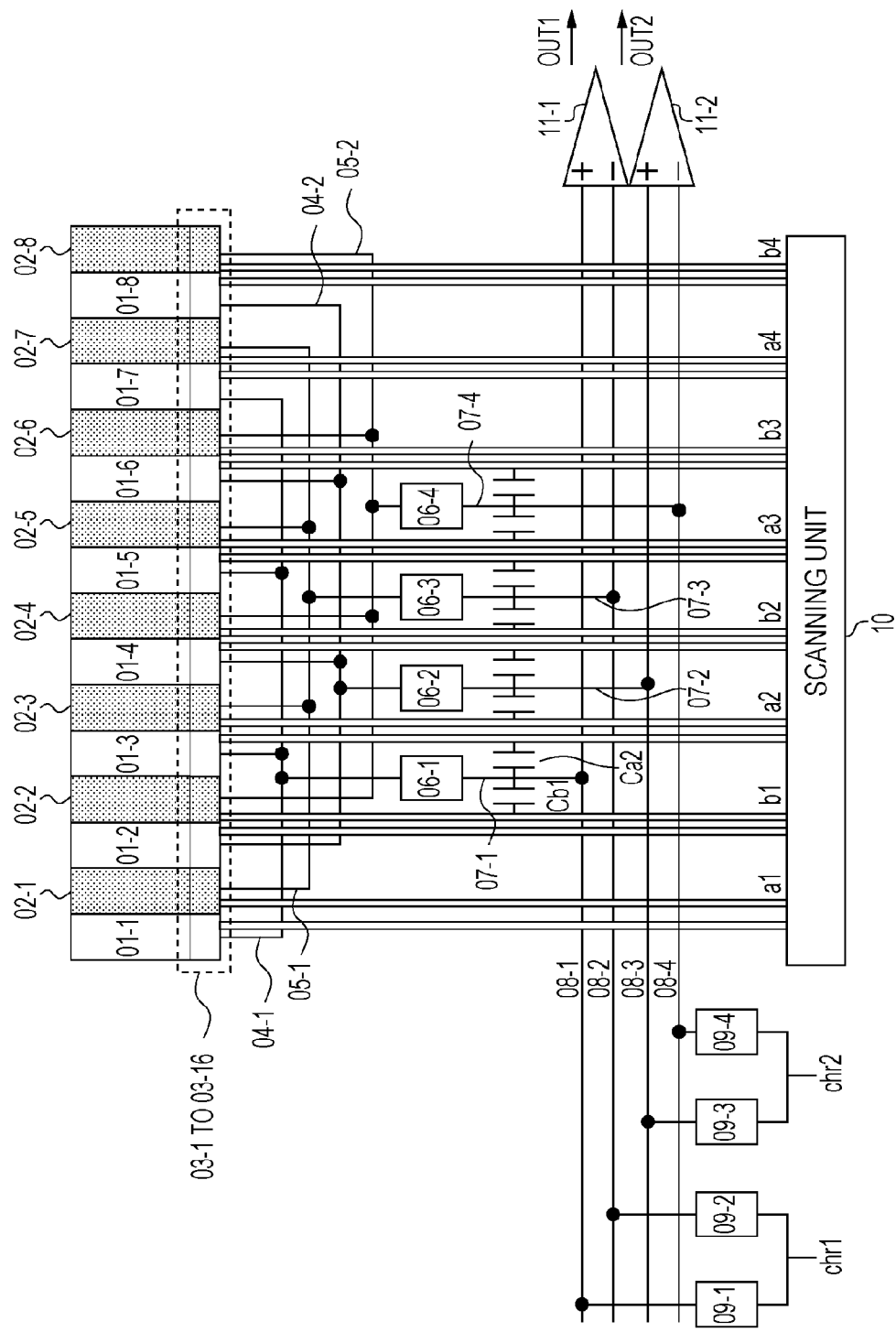
FIG. 7 is a diagram illustrating the layout of elements in a solid-state image pickup apparatus according to a third embodiment of the present invention.

The third embodiment of the present invention will be described with reference to FIGS. 7 and 8. In this embodiment, a solid-state image pickup apparatus capable of suppressing a noise signal by storing an optical signal (hereinafter referred to as an optical signal) on which a noise signal has been superimposed and a noise signal in different line memories and obtaining the difference between the optical signal and the noise signal will be described. The same reference numerals are used to identify parts already described in the first and second embodiments, and the description thereof will be therefore omitted. In order to facilitate the understanding of the feature of this embodiment, a comparative example will be described on the basis of a configuration disclosed in Japanese Patent Laid-Open No. 2005-086260.

The solid-state image pickup apparatus disclosed in Japanese Patent Laid-Open No. 2005-086260 stores an optical signal and a noise signal in different line memories and suppressing the noise signal with a differential signal between these signals.

Figure 5:
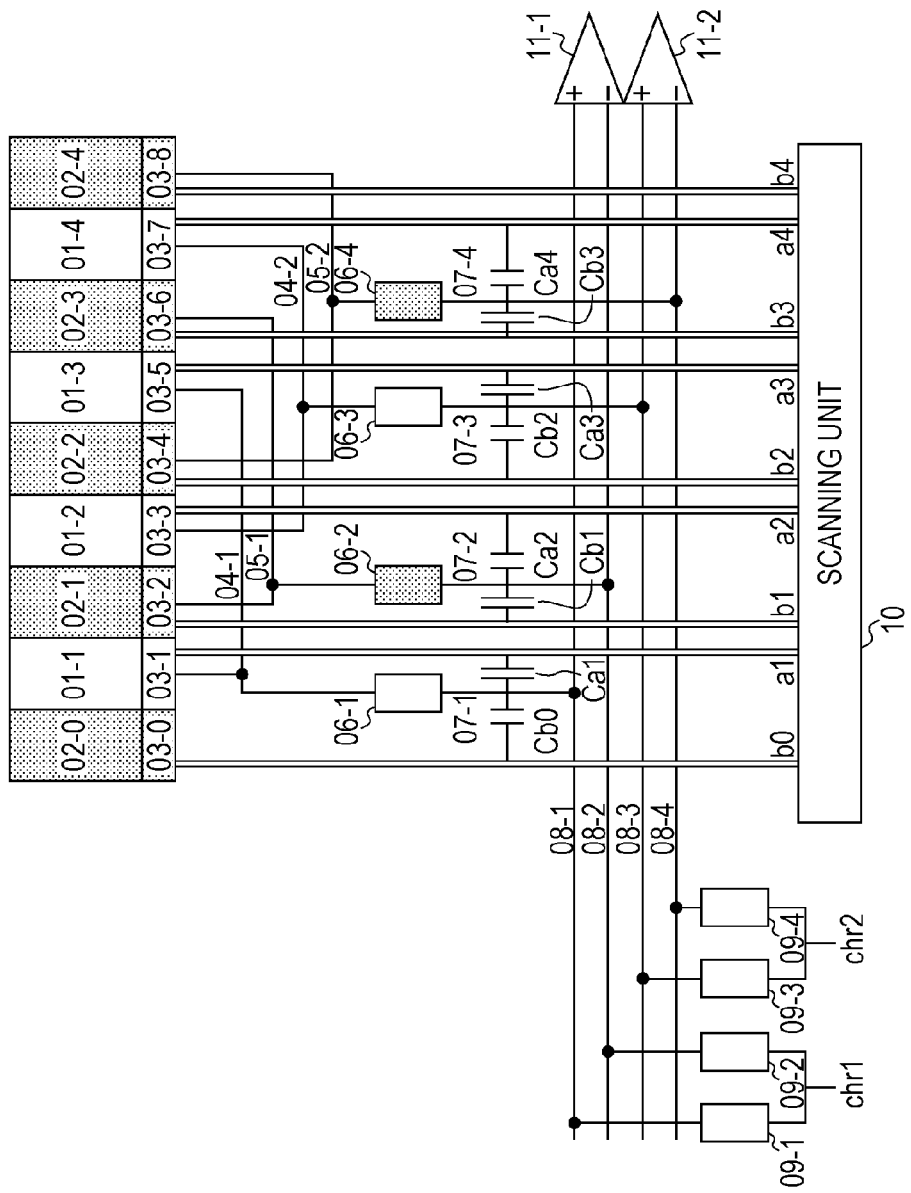
FIG. 5 is a diagram illustrating the layout of elements in a solid-state image pickup apparatus that is a comparative example.
Figure 6:
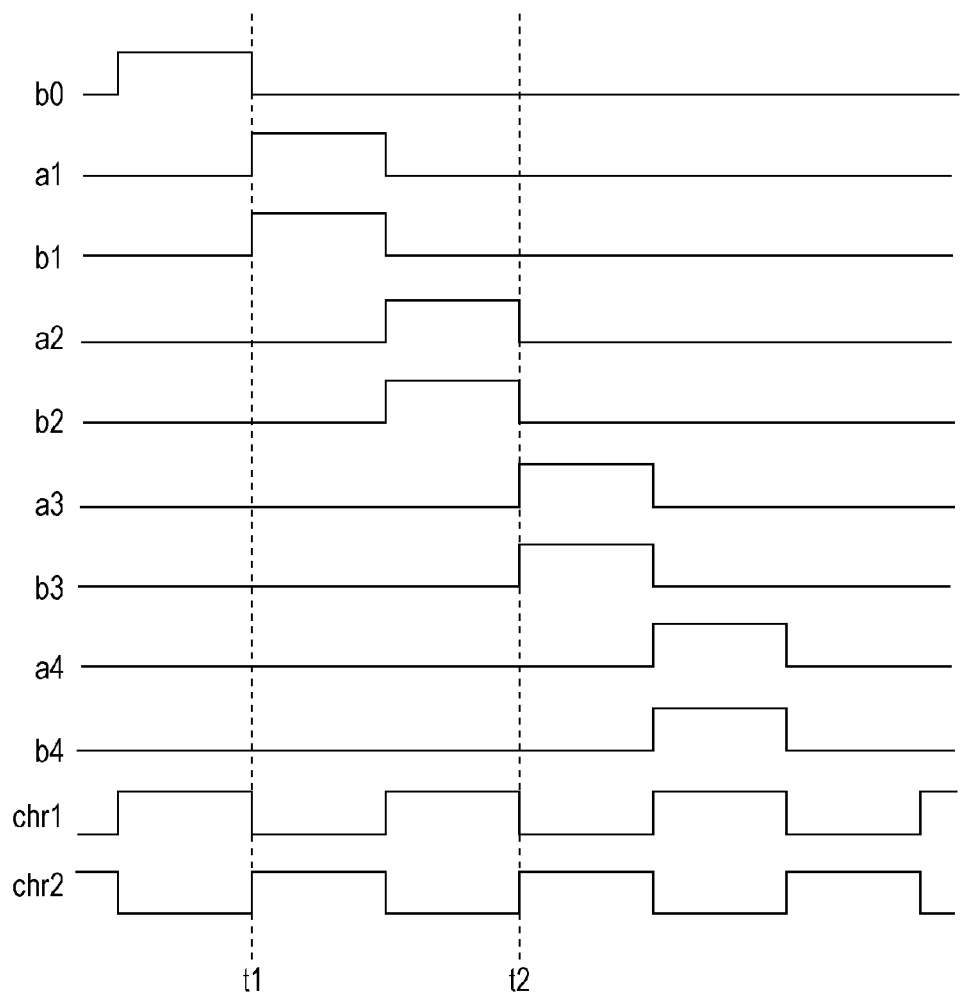
FIG. 6 is a timing chart describing the driving of a solid-state image pickup apparatus that is a comparative example.

FIG. 5 is a diagram illustrating an example of the layout of elements in a solid-state image pickup apparatus that is a comparative example. FIG. 6 is a diagram illustrating driving pulses for a solid-state image pickup apparatus that is a comparative example. In FIG. 5, line memories for optical signals are divided into two blocks, and line memories for noise signals are divided into two blocks. Line memories 01-1 to 01-4 are configured to store an optical signal. Line memories 02-1 to 02-4 are configured to store a noise signal. A storage unit 02-0 for storing a noise signal belongs to a preceding block, and is illustrated since a control line for the storage unit 02-0 generates a parasitic capacitance with a lead line.

Each of a first block line 04-1 and a second block line 04-2 receives an optical signal. Each of a first block line 05-1 and a second block line 05-2 receives a noise signal. Thus, block lines for optical signals are divided into two blocks, and block lines for noise signals are divided into two blocks.

First control lines a1 to a4 generate parasitic capacitances Ca1 to Ca4, respectively, with lead lines 07. Second control line b0 to b4 generate parasitic capacitances Cb0 to Cb4, respectively, with the lead lines 07. It is assumed that Ca1=Cb1=Ca3=Cb3 and Cb0=Ca2=Cb2=Ca4 are satisfied. Differential circuits 11-1 and 11-2 compute the difference between an optical signal and a noise signal, and may be disposed in a chip including a pixel region and a reading circuit or another chip.

FIG. 6 is a diagram illustrating driving pulses for a solid-state image pickup apparatus having the configuration illustrated in FIG. 5.

An optical signal and a noise signal the difference of which is to be obtained are individually read out to block lines at the same time.

At a time t1, at the common signal line 08-1, the parasitic capacitance Cb0, the fall of a pulse supplied to the second control line b0 to a low level, the parasitic capacitance Ca1, and the rise of a pulse supplied to the first control line a1 to a high level cause a voltage change represented by the following equation.

$$\Delta V08\text{-}1 \cong VDD \times Ca1/CH - VDD \times Cb0/CH = VDD \times (Ca1-Cb0)/CH \qquad \text{Equation (10)}$$

Here, the relationship of Ca1>Cb0 is set.

At the time t1, at the common signal line 08-2, the parasitic capacitance Cb1 and the rise of a pulse supplied to the second control line b1 to a high level cause a voltage change represented by the following equation.

$$\Delta V08\text{-}2 \cong VDD \times Cb1/CH \qquad \text{Equation (11)}$$

While high-level driving pulses are individually supplied to the first control line a1 and the second control line b1, the differential circuit computes the difference between signals read out to corresponding common signal lines. Since the computation of the difference is performed before the pulses fall from a high level, the computation of the difference is affected.

Even if the computation of the difference between signals read out to the common signal lines 08-1 and 08-2 is performed, fixed pattern noise represented by the following equation remains.

$$\Delta V08\text{-}1 - \Delta V08\text{-}2 \cong VDD \times (Ca1-Cb0-Cb1)/CH = -VDD \times Cb0/CH \qquad \text{Equation (12)}$$

At a time t2, a phenomenon similar to the above-described phenomenon occurs at common signal lines 08-3 and 08-4, and fixed pattern noise represented by the following equation remains.

$$\Delta V08\text{-}3 - \Delta V08\text{-}4 \cong -VDD \times Cb2/CH \qquad \text{Equation (13)}$$

That is, there is no pulse for causing a potential change in a direction for canceling a potential change in another direction.

With the reduction in a pixel pitch, the effect of parasitic capacitances is not negligible and the fixed pattern noise is increased.

As described previously, it is assumed that the relationship of Ca1>Cb0 is set. However, even if the relationship of Ca1≅Cb0 is set, that is, a lead line is disposed at the midpoint between control lines adjacent to the lead line, fixed pattern noise represented by the following equation remains.

$$\Delta V08\text{-}1 - \Delta V08\text{-}2 \cong VDD \times (Ca1 - Cb0 - Cb1)/CH = -VDD \times Cb0/CH = -VDD \times Cb1/CH \quad \text{Equation (14)}$$

The third embodiment will be described with reference to FIGS. 7 and 8. Elements included in a solid-state image pickup apparatus according to the third embodiment are similar to those included in the solid-state image pickup apparatus that is a comparative example. The difference between a solid-state image pickup apparatus according to the third embodiment and the solid-state image pickup apparatus that is a comparative example is the positions of lead lines. In a solid-state image pickup apparatus in which the difference between an optical signal and a noise signal is computed, it is possible to suppress an offset component superimposed on a signal by disposing lead lines in accordance with the rules described in the first and second embodiments. In a reading system for outputting an optical signal and a reading system for outputting a noise signal, the assignment of an odd number or an even number to pixel columns is performed in accordance with the arrangement order of the pixel columns. That is, in FIG. 7, in the reading system for outputting an optical signal, each of storage units 01-1, 01-3, 01-5, and 01-7 stores a signal output from an odd-numbered pixel column and each of storage units 01-2, 01-4, 01-6, and 01-8 stores a signal output from an even-numbered pixel column. In the reading system for outputting a noise signal, each of storage units 02-1, 02-3, 02-5, and 02-7 stores a signal output from an odd-numbered pixel column and each of storage units 02-2, 02-4, 02-6, and 02-8 stores a signal output from an even-numbered pixel column. The first lead line 07-1 and a first lead line 07-3 transmit signals output from odd-numbered pixel columns to the first common signal lines 08-1 and 08-2, respectively. The second lead line 07-2 and a second lead line 07-4 transmit signals output from even-numbered pixel columns to second common signal lines 08-3 and 08-4, respectively.

Each of the first lead lines 07-1 and 07-3 to which a signal output from an odd-numbered pixel column is read out is disposed between the second control line b1 and the first control line a2, between the second control line b2 and the first control line a3, or between the second control line b3 and the first control line a4. In this embodiment, the first lead line 07-1 is disposed between the second control line b1 and the first control line a2 and the first lead line 07-3 is disposed between the second control line b2 and the first control line a3.

Each of the second lead lines 07-2 and 07-4 to which a signal output from an even-numbered pixel column is read out is disposed between the first control line a1 and the second control line b1, between the first control line a2 and the second control line b2, between the first control line a3 and the second control line b3, or between the first control line a4 and the second control line b4. In this embodiment, the second lead line 07-2 is disposed between the first control line a2 and the second control line b2 and the second lead line 07-4 is disposed between the first control line a3 and the second control line b3.

Figure 8:
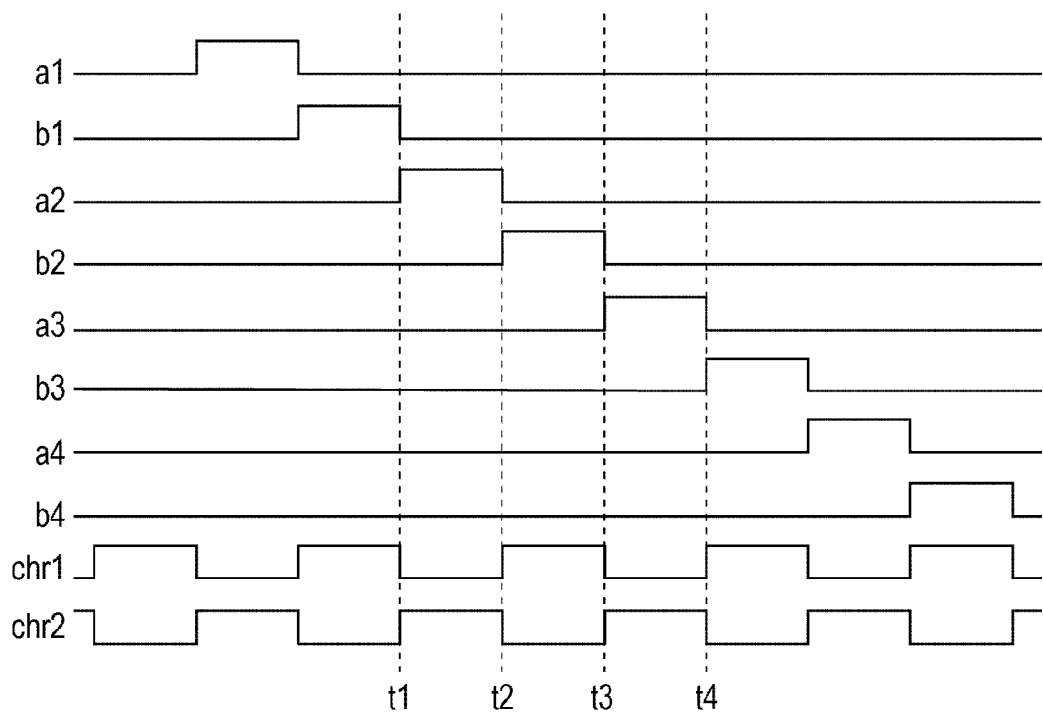
FIG. 8 is a timing chart describing the driving of a solid-state image pickup apparatus according to the third embodiment.

FIG. 8 is a diagram describing driving of a solid-state image pickup apparatus according to the third embodiment. Immediately before a time t1, the reset unit 09-1 receives a control signal from the reset control line chr1 and resets the potential of the first common signal line 08-1.

At the time t1, a low-level driving pulse is supplied to the second control line b1 and a period in which signals stored in the storage units 01-2 and 02-2 are read out ends. At that time, at the first common signal line 08-1, the parasitic capacitance Cb1 and the fall of a pulse supplied to the second control line b1 cause a negative voltage change (deflection) represented by the following equation.

$$\Delta V08\text{-}1 \cong -VDD \times Cb1/CH \quad \text{Equation (15)}$$

At the time t1, a high-level pulse is supplied to the first control line a2 and signals stored in the storage units 01-3 and 02-3 are output to the first common signal lines 08-1 and 08-2, respectively. The parasitic capacitance Ca2 and the rise of a pulse supplied to the first control line a2 cause a positive voltage change (deflection) represented by the following equation.

$$\Delta V08\text{-}1 \cong VDD \times Ca2/CH \quad \text{Equation (16)}$$

The total voltage change (deflection) is represented by the following equation.

$$\Delta V08\text{-}1 \cong VDD \times Ca2/CH - VDD \times Cb1/CH = VDD \times (Ca2 - Cb1)/CH \quad \text{Equation (17)}$$

Accordingly, potential changes in directions that cancel each other are caused.

By disposing the second control line b1, the first control line a2, and the first lead line 07-1 at regular intervals, the relationship of Cb1=Ca2 can be set. At that time, the following equation can be obtained.

$$\Delta V08\text{-}1 \cong VDD \times Ca2/CH - VDD \times Cb1/CH = VDD \times (Ca2 - Cb1)/CH \cong 0 \quad \text{Equation (17')}$$

At the time t1, since the change in a driving pulse does not occur at the second control line b2 on one side of the first lead line 07-3 and the first control line a3 on the other side of the first lead line 07-3, a voltage change caused by a driving pulse supplied to a control line does not occur at the first common signal line 08-2. Accordingly, fixed pattern noise is suppressed.

At each of times t2, t3, and t4, a high-level pulse is supplied to a corresponding control line, a signal stored in a corresponding storage unit is read out, and a voltage change similar to the above-described voltage change occurs. Accordingly, a solid-state image pickup apparatus capable of suppressing fixed pattern noise can be obtained.

According to this embodiment, in a solid-state image pickup apparatus in which a noise component in an optical signal on which a noise signal has been superimposed is suppressed, it is possible to suppress an offset component in a signal read out to a common signal line which is generated by a pulse supplied to a control line.

Figure 9:
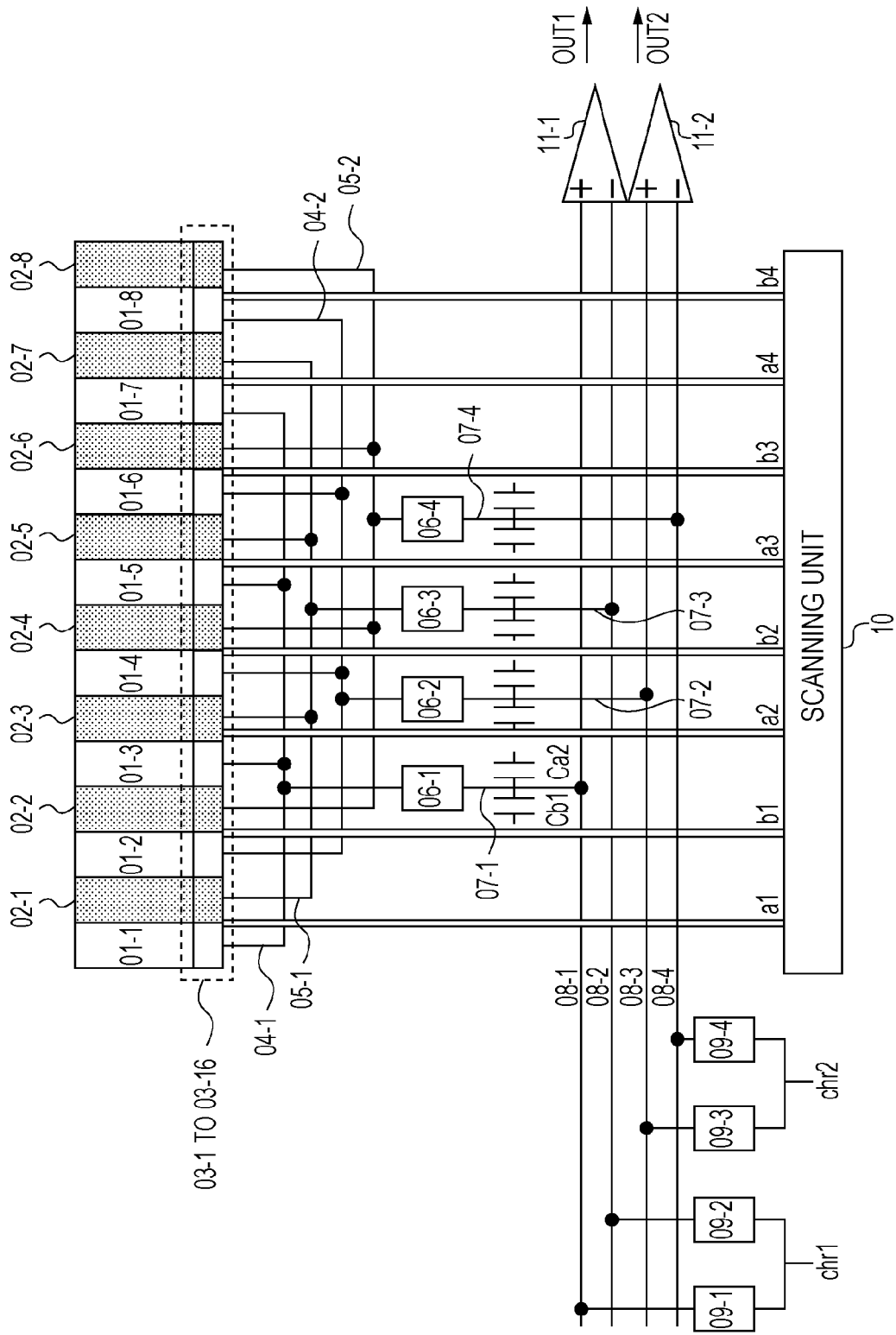
FIG. 9 is a diagram illustrating the layout of elements in a solid-state image pickup apparatus that is an exemplary modification of the third embodiment.

FIG. 9 is a diagram illustrating a solid-state image pickup apparatus that is an exemplary modification of the third embodiment. In FIG. 7, a control line is disposed for each storage unit. In FIG. 9, a common control line is disposed for a plurality of storage units for storing signals the difference between which is to be obtained. That is, the reading of signals from a plurality of storage units is controlled with the same line. Using this configuration, the number of lines can be further reduced.

Although embodiments of the present invention have been described, the present invention is not limited to thereto. It will be understood that changes and modifications may be made as appropriate without departing from the spirit and scope of the invention. For example, in the above-described embodiments, a plurality of lead lines are disposed so that they are adjacent to one another. However, between the lead lines, many control lines may be disposed. In the above-described embodiments, a first lead line to which signals output from odd-numbered pixel columns are read out is disposed on the upstream side of the scanning direction. However, a second lead line to which signals output from even-numbered pixel columns are read out may be disposed on the upstream side of the scanning direction.

That is, a first block line receives a signal that has been output from one of an odd-numbered pixel column and an even-numbered pixel and then has been stored in a storage unit, and a second block line receives a signal that has been output from the other one of the odd-numbered pixel column and the even-numbered pixel and then has been stored in a storage unit. Accordingly, the correspondence between a pixel column (an odd-numbered pixel column or an even-numbered pixel column) and a lead line (a first lead line or a second lead line) may be changed.

An embodiment of the present invention is applied to a solid-state image pickup apparatus in a digital camera (still camera), a digital video camera, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-025868 filed Feb. 8, 2010, which is hereby incorporated by reference herein in its entirety.

What is claimed is:

1. An apparatus comprising:
a pixel region including a plurality of pixel columns;
a line memory including a plurality of storage units each configured to store a signal output from corresponding one of the plurality of pixel columns;
a first common signal line to which a signal is output from the line memory;
a second common signal line to which a signal is output from the line memory;
a first block line that is disposed on a first signal path between the line memory and the first common signal line and is configured to receive a signal that has been output from one of an odd-numbered pixel column and an even-numbered pixel column and has been stored in one of the plurality of storage units;
a second block line that is disposed on a second signal path between the line memory and the second common signal line and is configured to receive a signal that has been output from the other one of the odd-numbered pixel column and the even-numbered pixel column and has been stored in one of the plurality of storage units;
a plurality of first switches that are disposed on a third signal path between the line memory and the first block line and are each configured to control an electric connection between one of the plurality of storage units and the first block line;
a plurality of second switches that are disposed on a fourth signal path between the line memory and the second block line and are each configured to control an electric connection between one of the plurality of storage units and the second block line;
a plurality of first control lines each configured to supply a first driving pulse for controlling a conductive state of one of the plurality of first switches;
a plurality of second control lines each configured to supply a second driving pulse for controlling a conductive state of one of the plurality of second switches;
at least one first lead line configured to transmit a signal output from the first block line to the first common signal line;
at least one second lead line configured to transmit a signal output from the second block line to the second common signal line; and
a scanning unit configured to individually supply driving pulses to the plurality of first control lines and the plurality of second control lines,
wherein one of the first or second control lines and one of the first or second lead lines is alternately disposed along a direction parallel to the scanning circuit so that
one of the plurality of second control lines, the first lead line, one of the plurality of first control lines, the second lead line, and a different one of the plurality of second control lines are disposed in this order along the direction parallel to the scanning direction of the scanning unit.

2. The apparatus according to claim 1, further comprising a reset unit configured to reset potentials of the first common signal line and the second common signal line.

3. The apparatus according to claim 2, wherein a reset period of the first common signal line and a signal reading period of the second common signal line overlap.

4. The apparatus according to claim 1, wherein the line memory includes a plurality of storage units each configured to store an optical signal on which a noise signal has been superimposed and a plurality of storage units each configured to store a noise signal.

5. The apparatus according to claim 4, wherein the same one of the plurality of first control lines individually supplies driving pulses to one of the plurality of first switches corresponding to one of the plurality of storage units each configured to store an optical signal and one of the plurality of first switches corresponding to one of the plurality of storage units each configured to store a noise signal.

6. The apparatus according to claim 5, wherein the same one of the plurality of second control lines individually supplies driving pulses to one of the plurality of second switches corresponding to one of the plurality of storage units each configured to store an optical signal and one of the plurality of second switches corresponding to one of the plurality of storage units each configured to store a noise signal.

7. The apparatus according to claim 1,
wherein the first lead line is disposed at a midpoint in a direction in which the first block line extends and is connected to the first block line, and
wherein the second lead line is disposed at a midpoint in a direction in which the second block line extends and is connected to the second block line.

8. The apparatus according to claim 1,
wherein one of the plurality of second control lines and one of the plurality of first control lines are adjacent to each other via the first lead line along the direction parallel to a scanning direction of the scanning unit, and a period in which a driving pulse supplied to the second control line falls and a period in which a driving pulse supplied to the first control line rises partly overlap, and
wherein one of the plurality of first control lines and one of the plurality of second control lines are adjacent to each other via the second lead line along the direction parallel to the scanning direction, and a period in which a driving pulse supplied to the first control line falls and a period in which a driving pulse supplied to the second control line rises partly overlap.

9. The apparatus according to claim 1, wherein a period in which a driving pulse supplied to one of the plurality of first control lines is at a high level and a period in which a driving pulse supplied to one of the plurality of second control lines is at a high level overlap.

10. The apparatus according to claim 1,
wherein a part of a period of transition of a pulse, from ON state to OFF state, output to the second control line that is adjacent to the first lead line and a part of a period of transition of a pulse, from OFF state to ON state, output to the first control line that is adjacent to the first lead line overlap, and
wherein a part of a period of transition of a pulse, from ON state to OFF state, output to the first control line that is adjacent to the second lead line and a part of a period of transition of a pulse, from OFF state to ON state, output to the second control line that is adjacent to the second lead line overlap.

11. A method comprising:
storing a signal output from corresponding one of a plurality of pixel columns of a pixel region in a storage unit of a plurality of storage units of a line memory;
outputting a signal from the line memory to a first common signal line;
outputting a signal from the line memory to a second common signal line;
disposing a first block line on a first signal path between the line memory and the first common signal line and receiving a signal that has been output from one of an odd-numbered pixel column and an even-numbered pixel column and has been stored in one of the plurality of storage units;
disposing a second block line on a second signal path between the line memory and the second common signal line and receiving a signal that has been output from the other one of the odd-numbered pixel column and the even-numbered pixel column and has been stored in one of the plurality of storage units;
disposing a plurality of first switches on a third signal path between the line memory and the first block line and controlling an electric connection between one of the plurality of storage units and the first block line;
disposing a plurality of second switches on a fourth signal path between the line memory and the second block line and controlling an electric connection between one of the plurality of storage units and the second block line;
supplying a driving pulse for controlling a conductive state of one of the plurality of first switches by a first control line of a plurality of first control lines;
supplying a driving pulse for controlling a conductive state of one of the plurality of second switches by a second control line of a plurality of second control lines;
transmitting a signal output from the first block line to the first common signal line by at least one first lead line;
transmitting a signal output from the second block line to the second common signal line by at least one second lead line;
supplying driving pulses to the plurality of first control lines and the plurality of second control lines by a scanning unit; and
alternately disposing one of the first or second control lines and one of the first or second lead lines along a direction parallel to the scanning unit so that
one of the plurality of second control lines, the first lead line, one of the plurality of first control lines, the second lead line, and a different one of the plurality of second control lines are disposed in this order along the direction parallel to the scanning direction of the scanning unit.

12. The method according to claim 11, further comprising resetting potentials of the first common signal line and the second common signal line.

13. The method according to claim 12, wherein a reset period of the first common signal line and a signal reading period of the second common signal line overlap.

14. The method according to claim 11, further comprising:
storing an optical signal on which a noise signal has been superimposed in a storage unit of a plurality of storage units each configured to store an optical signal of the line memory; and
storing a noise signal in a storage unit of a plurality of storage units each configured to store a noise signal of the line memory.

15. The method according to claim 14, further comprising supplying driving pulses to one of the plurality of first switches corresponding to one of the plurality of storage units each configured to store an optical signal and one of the plurality of first switches corresponding to one of the plurality of storage units each configured to store a noise signal by the same one of the plurality of first control lines.

16. The method according to claim 15, further comprising supplying driving pulses to one of the plurality of second switches corresponding to one of the plurality of storage units each configured to store an optical signal and one of the plurality of second switches corresponding to one of the plurality of storage units each configured to store a noise signal by the same one of the plurality of second control lines.

17. The method according to claim 1, further comprising:
disposing the first lead line at a midpoint in a direction in which the first block line extends and connecting the first lead line to the first block line; and
disposing the second lead line at a midpoint in a direction in which the second block line extends and connecting the second lead line to the second block line.

18. The method according to claim 1,
wherein one of the plurality of second control lines and one of the plurality of first control lines are adjacent to each other via the first lead line along the direction parallel to a scanning direction of the scanning unit, and a period in which a driving pulse supplied to the second control line falls and a period in which a driving pulse supplied to the first control line rises partly overlap, and
wherein one of the plurality of first control lines and one of the plurality of second control lines are adjacent to each other via the second lead line along the direction parallel to the scanning direction, and a period in which a driving pulse supplied to the first control line falls and a period in which a driving pulse supplied to the second control line rises partly overlap.

19. The method according to claim 11, wherein a period in which a driving pulse supplied to one of the plurality of first control lines is at a high level and a period in which a driving pulse supplied to one of the plurality of second control lines is at a high level overlap.

20. The method according to claim 11,
wherein a part of a period of transition of a pulse, from ON state to OFF state, output to the second control line that is adjacent to the first lead line and a part of a period of transition of a pulse, from OFF state to ON state, output to the first control line that is adjacent to the first lead line overlap, and
wherein a part of a period of transition of a pulse, from ON state to OFF state, output to the first control line that is adjacent to the second lead line and a part of a period of transition of a pulse, from OFF state to ON state, output to the second control line that is adjacent to the second lead line overlap.

* * * * *